United States Patent [19]
Meyer

[11] 4,053,700
[45] Oct. 11, 1977

[54] COUPLING FLEX-PLATE CONSTRUCTION FOR GAS-INSULATED TRANSMISSION LINES

[75] Inventor: Jeffry R. Meyer, Pittsburgh, Pa.

[73] Assignee: Westinghouse Electric Corporation, Pittsburgh, Pa.

[21] Appl. No.: 584,432

[22] Filed: June 6, 1975

[51] Int. Cl.² .............................................. H01B 9/04
[52] U.S. Cl. ................................ 174/21 C; 174/12 R
[58] Field of Search ............. 174/21 R, 21 C, 21 CA, 174/22 R, 12 R

[56] References Cited

U.S. PATENT DOCUMENTS 3,373,242  3/1968  Sewell ................................ 174/21 C

*Primary Examiner*—Arthur T. Grimley
*Attorney, Agent, or Firm*—W. R. Crout

[57] ABSTRACT

A coupling flex-plate member comprising a circular metallic member having a centrally-disposed annular groove provided therein, providing a generally H-shaped cross-section, is fixedly secured to the confronting ends of adjacent inner high-voltage tubular conductors of a gas-insulated transmission line to permit a limited, but sufficient flexibility, of the inner conductor sections, or conductor buses. A low-strength high-conductivity material is used for the coupling flex-plate member, and permits an axial bending in a spring-like fashion until material yielding occurs. Inaccuracies during fabrication and assembly of the component parts are accommodated by the use of such a coupling flex-plate member without damaging adjacent components, especially spacing insulators, which are, of course, brittle and subject to fracture.

5 Claims, 2 Drawing Figures

U.S. Patent  Oct. 11, 1977  4,053,700
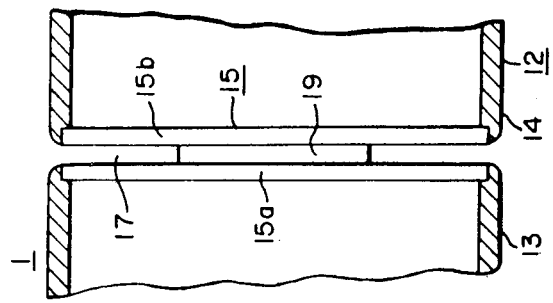
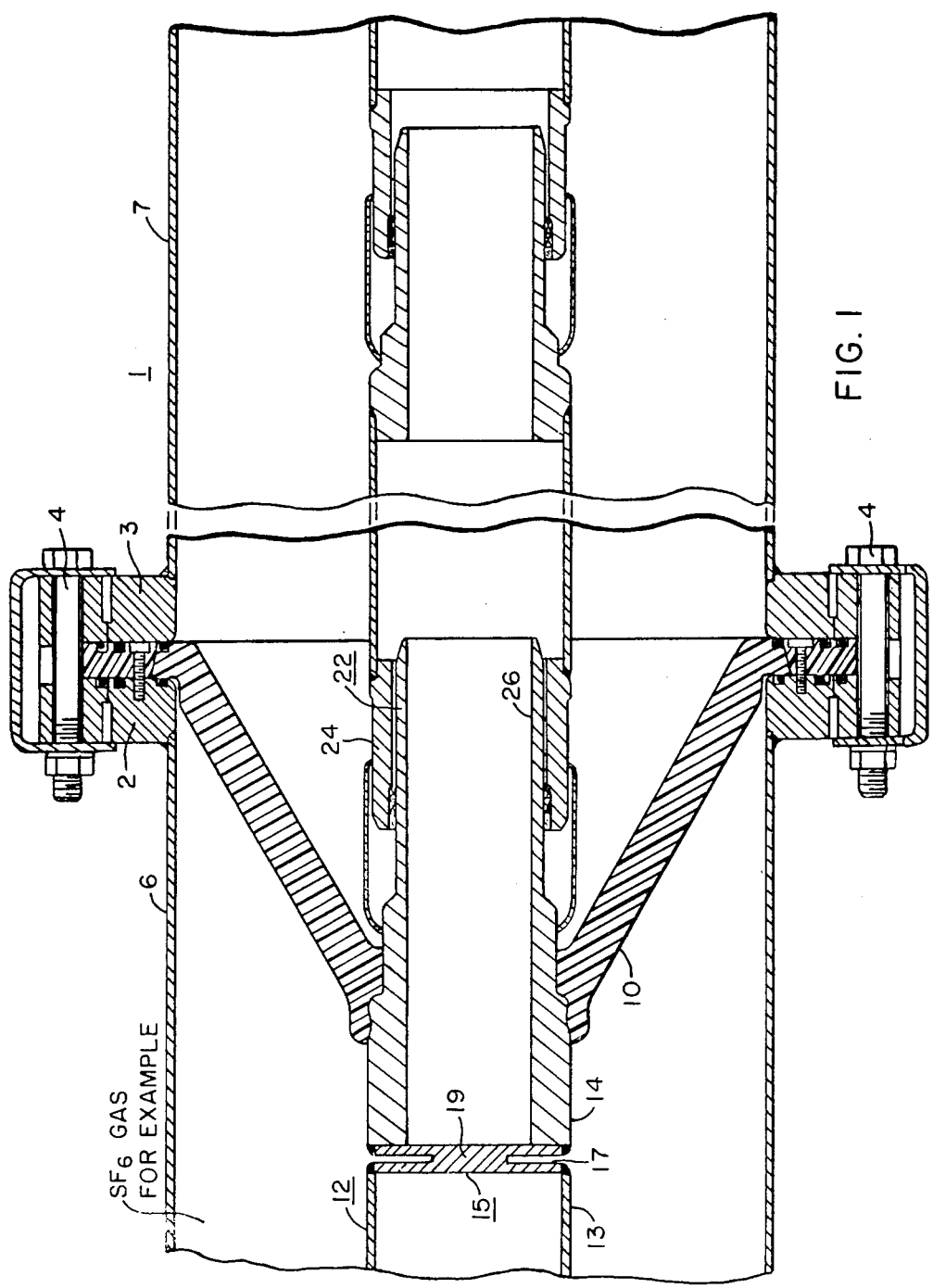

COUPLING FLEX-PLATE CONSTRUCTION FOR GAS-INSULATED TRANSMISSION LINES

CROSS-REFERENCES TO RELATED APPLICATIONS

Applicant is not aware of any related patent application pertinent to the present invention, but reference may be made to U.S. patent application Ser. No. 585,729, filed June 10, 1975 by J.R. Meyer et al. and patent application Ser. No. 588,572, filed June 19, 1975 by J.R. Meyer.

BACKGROUND OF THE INVENTION

The use of gas-insulated transmission lines has become more prevalent in recent years because of the more limited amount of real estate involved, which is required for such miniaturized high-voltage gas-insulated substations, such as set forth in U.S. Pat. Nos. 3,378,731 — Whitehead and 3,391,243 — Whitehead.

It is, of course, necessary for the gas-insulated transmission lines to accommodate inner high-voltage conductors disposed axially within an outer grounded metallic casing, and to provide couplings therefor, such as set forth in U.S. Pat. No. 3,391,243, as well known by those skilled in the art.

During fabrication and assembly of such substation installations, bending and misalignments of the bus-sections and casings may occur, which must be accommodated. The present invention provides such accommodation and coupling of adjacent bus-sections.

SUMMARY OF THE INVENTION

In accordance with the present invention, a recessed end plate coupling of generally H-shaped cross-section is fixedly secured to each of the two confronting inner high-voltage conductors. Thus, any axial bending or inaccuracies of such adjacent conductors are accommodated by the flex-plate coupling member itself, which allows limited axial bending in a spring-like manner until material yielding occurs. At this point, the load to continued deformation is constant until the edges of the flex-plate coupling member meet, at which time the inner conductor bending stops. Thus, a limited controlled load flexibility results.

BRIEF DESCRIPTION OF THE DRAWINGS

FIG. 1 is a longitudinal vertical sectional view taken through a gas-insulated transmission line showing the abutment of two bus-sections and the utilization of the improved flex-plate coupling member of the instant invention; and FIG. 2 is a considerably-enlarged view showing the flex-plate mounting of FIG. 1.

DESCRIPTION OF THE PREFERRED EMBODIMENT

With reference to FIG. 1, it will be observed that there is illustrated a section of a gas-insulated transmission line 1 having confronting pipe, or casing sections 2 and 3 making abutting flange-like engagement by bolts 4. Disposed between the annular flange portions 2, 3 of the respective casing sections 6, 7, is an insulator member 10, the configuration and construction of which is set forth in United States patent filed June 10, 1975, Ser. No. 585,729, and assigned to the assignee of the instant patent application.

It will be observed that the insulator 10 supports an interiorly axially-located high-voltage line conductor 12, which utilizes the improved coupling flex-plate 15 of the present invention. As more clearly illustrated in FIG. 2, the coupling flex-plate 15 constitutes a circular metallic plate member having a peripheral recess 17 extending around its circumference, thus resulting in a central solid body-portion 19, of generally H-shaped cross-section, carrying the line current.

Inaccuracies are built into gas-insulated components as a natural result of manufacturing tolerances allowed. When gas-insulated substations are assembled, these inaccuracies must be allowed for to make possible the assembly without damaging components, especially insulator spacers 10 (which are the most brittle). The inner conductor 12 is normally a rigid tube, which requires a high lateral load to cause the significant motion necessary to allow safe station assembly. The coupling flex-plate 15 is a simple means of allowing a limited but sufficient flexibility of this inner conductor 12, 13. A low-strength, high-conductivity material is used. When mounted, it allows axial bending in a spring-like fashion until material yielding occurs.

After this point, the load to continue deformation is constant until the edges of the plate 15 meet, at which time the inner conductor bending stops. Thus, a limited, controlled load flexibility results. The flex-plate 15 also does not significantly reduce electric integrity and will carry the conductor current without creating undesirable temperature rise.

As illustrated in FIG. 1, an expansion joint 22 is provided including an outer sleeve member 24, which makes sliding contact with an inner tubular male member 26 to permit temperature expansion and contractions without rupture. The details of the insulator support, together with the expansion construction, are set forth in the aforesaid patent application, Ser. No. 585,729.

From the foregoing description, it will be apparent that the inner conductors 12, 13 in gas-insulated substations are provided with a means of allowing flexibility to accommodate the manufacturing tolerances, which would impose high mechanical stress upon insulators 10 were the flexibility not allowed or permitted. The present invention provides this accommodating function while satisfying the various other mechanical and electrical functions necessary in the substation.

Although there has been illustrated and described a specific structure, it is to be clearly understood that the same was merely for the purpose of illustration, and that changes and modifications may readily be made therein by those skilled in the art without departing from the spirit and scope of the invention.

I claim as my invention:

1. A high-voltage gas-insulated transmission-line capable of carrying relatively-heavy currents including a plurality of axially-aligned outer-disposed independent metallic grounded casing sections (6,7), means securing said independent metallic grounded casing sections (6,7) together in end-to-end axially-aligned fashion, a plurality of axially-aligned inner-disposed open-ended tubular high-voltage independent conductors (13,14) disposed centrally within said outer-disposed grounded axially-aligned casing sections (6,7), an insulating gas disposed within the annular space between the inner-disposed conductors (13,14) and the outer-disposed grounded metallic casing sections (6,7), a solid self-supporting flex-plate coupling member (15) interposed between the confronting open ends of two juxtaposed inner high-voltage conductors (13,14) and secured thereto to completely block the open confronting ends thereof, said solid self-supporting flex-plate coupling member (15) having a centrally-disposed, outer peripheral recess (17) thereby resulting in a substantially solid "H"-shaped cross-sectional configuration, whereby the solid inner central core position (19) of said solid self-supporting flex-plate coupling member (15) permits only lateral flexing motion of the inner-disposed conductors (13,14) yet nevertheless can carry relatively-heavy transmission-line currents.

2. The high-voltage gas-insulated transmission-line construction of claim 1, wherein the insulating gas is sulfur-hexafluoride ($SF_6$) gas.

3. The combination according to claim 1, wherein a supporting insulator (10) is disposed adjacent the flex-plate coupling member (15) and assists in supporting at least one of the inner-disposed high-voltage independent conductors (13,14).

4. The combination according to claim 3, wherein an expansion joint (22) is provided adjacent said coupling member (15) including an outer sleeve member (24) and an inner-disposed tubular metallic conductor member (26) making sliding contact therewith to permit temperature expansion and contraction during operating conditions without rupture.

5. The combination according to claim 3, wherein the supporting insulator (10) has a generally conical shape with a radially-outwardly-directed annular flange-portion, and said securing means for the outer-disposed metallic grounded casing sections (6,7) having confronting annular flange portions (2,3) disposed on opposite sides of said flange-portion and secured thereto.

* * * * *